US012772194B2

(12) United States Patent
Balasubramaniam et al.

(10) Patent No.: US 12,772,194 B2
(45) Date of Patent: Oct. 20, 2026

(54) METHOD, APPARATUS AND COMPUTER PROGRAM

(71) Applicant: Nokia Technologies Oy, Espoo (FI)

(72) Inventors: Sankaran Balasubramaniam, Bangalore (IN); Anna Pantelidou, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 286 days.

(21) Appl. No.: 18/404,331

(22) Filed: Jan. 4, 2024

(65) Prior Publication Data

US 2024/0276421 A1 Aug. 15, 2024

(30) Foreign Application Priority Data

Feb. 15, 2023 (IN) ............................. 202341010091

(51) Int. Cl.
*H04W 64/00* (2009.01)
*H04W 8/22* (2009.01)
*H04W 24/02* (2009.01)

(52) U.S. Cl.
CPC ............ *H04W 64/00* (2013.01); *H04W 8/22* (2013.01); *H04W 24/02* (2013.01)

(58) Field of Classification Search
CPC ....... H04W 64/00; H04W 8/22; H04W 24/02; H04W 88/08; H04W 92/10; H04W 92/14; G06N 20/00; G01S 5/02
See application file for complete search history.

(56) References Cited

U.S. PATENT DOCUMENTS

| | | | | |
|---|---|---|---|---|
| 6,184,829 B1 * | 2/2001 | Stilp | ..................... | H04W 64/00 342/174 |
| 11,792,614 B2 * | 10/2023 | Zorgui | .................. | G01S 5/0244 455/456.2 |
| 2007/0155401 A1 * | 7/2007 | Ward | .................... | H04W 64/00 455/456.1 |
| 2007/0155489 A1 * | 7/2007 | Beckley | .............. | G07F 17/3237 463/29 |
| 2021/0297982 A1 | 9/2021 | Zhang et al. | | |
| 2021/0345285 A1 | 11/2021 | Tenny et al. | | |
| 2022/0150809 A1 | 5/2022 | Guo et al. | | |

FOREIGN PATENT DOCUMENTS

| | | |
|---|---|---|
| EP | 4120755 A1 | 1/2023 |
| WO | 2021/032907 A1 | 2/2021 |

OTHER PUBLICATIONS

Extended European Search Report received for corresponding European Patent Application No. 24150284.8, dated Jun. 18, 2024, 9 pages.

(Continued)

*Primary Examiner* — Charles T Shedrick
(74) *Attorney, Agent, or Firm* — Carter, DeLuca & Farrell LLP

(57) ABSTRACT

There is provided an apparatus comprising means for determining, by the apparatus, that position information of a user equipment is needed for one or more functions to be performed at the apparatus; and means for triggering a location procedure for obtaining positioning information of the user equipment, in response to the determining that position information of the user equipment is needed.

1 Claim, 9 Drawing Sheets

(56) References Cited

OTHER PUBLICATIONS

"Positioning Client Functionality in NG-RAN", 3GPP TSG-RAN WG3 #106, R3-197293, Agenda: 26.3, Ericsson, Nov. 18-22, 2019, 5 pages.
"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.
"3rd Generation Partnership Project; Technical Specification Group Radio Access Network; NG-RAN; NG Application Protocol (NGAP) (Release 17)", 3GPP TS 38.413, V17.2.0, Sep. 2022, pp. 1-576.
"3rd Generation Partnership Project; Technical Specification Group Radio Access Network; NG-RAN; NR Positioning Protocol A (NRPPa) (Release 17)", 3GPP TS 38.455, V17.2.0, Sep. 2022, pp. 1-201.
"3rd Generation Partnership Project; Technical Specification Group Radio Access Network; LTE Positioning Protocol (LPP) (Release 17)", 3GPP TS 37.355, V17.1.0, Jun. 2022, pp. 1-345.
"3rd Generation Partnership Project; Technical Specification Group Radio Access Network; Evolved Universal Terrestrial Radio Access (E-UTRA) and NR; Study on enhancement for Data Collection for NR and EN-DC (Release 17)", 3GPP TR 37.817, V17.0.0, Apr. 2022, pp. 1-23.
"AI/ML Architecture", 3GPP TSG-RAN WG3 Meeting #113-e, R3-213373, Agenda: 18.2, Qualcomm Incorporated, Aug. 16-26, 2021, 4 pages.
"RAN AI/ML analytics data connection to NWDAF", 3GPP TSG-SA WG2#146E e-meeting, S2-2106005, Agenda: 9.1.3, Qualcomm Incorporated, Aug. 16-27, 2021, 1 page.
"3rd Generation Partnership Project; Technical Specification Group Radio Access Network; Study on local NR positioning in NG-RAN (Release 16)", 3GPP TR 38.856, V16.0.0, Dec. 2019, pp. 1-18.
"3rd Generation Partnership Project, Technical Specification Group Services and System Aspects; Study of Enablers for Network Automation for 5G 5G System (5GS); Phase 3 (Release 18)", 3GPP TR 23.700-81, V1.0.0, Sep. 2022, pp. 1-257.
"3rd Generation Partnership Project; Technical Specification Group Services and System Aspects; 5G System (5GS) Location Services (LCS); Stage 2 (Release 17)", 3GPP TS 23.273, V17.6.0, Sep. 2022, pp. 1-108.
"5G; NG Radio Access Network (NG-RAN); Stage 2 functional specification of User Equipment (UE) positioning in NG-RAN (3GPP TS 38.305 version 15.0.0 Release 15", ETSI TS 138 305, V15.0.0, Sep. 2018, pp. 1-57.
"Reply LS on latency improvement in NR positioning", 3GPP TSG-RAN WG3 #114bis-e, R3-221254, CATT, Jan. 17-26, 2022, 1 page.

* cited by examiner

METHOD, APPARATUS AND COMPUTER PROGRAM

FIELD

The present application relates to a method, apparatus, system and computer program, and in particular but not exclusively to location procedures.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks.

SUMMARY

According to a first aspect there is provided a radio access network apparatus comprising: means for determining, by the apparatus, that position information of a user equipment is needed for one or more functions to be performed at the apparatus; and means for triggering a location procedure for obtaining positioning information of the user equipment, in response to the determining that position information of the user equipment is needed.

According to some examples the radio access network apparatus comprises means for acting as a Location Control Session Client.

According to some examples the apparatus comprises means for sending a request to a core network entity for the positioning information of the user equipment.

According to some examples the request to the core network comprises a Location Control Session Quality of Service threshold value.

According to some examples the apparatus comprises means for checking positioning capability information of the user equipment, in response to the determining that position information of the user equipment is needed, and performing the triggering a location procedure in a manner dependent on the capability information.

According to some examples the apparatus comprises means for sending a request for the positioning capability information of the user equipment.

According to some examples the apparatus comprises means for receiving the positioning capability information of the user equipment without having sent a request.

According to some examples the positioning capability information of the user equipment comprises information of a positioning mode capability or a positioning method capability.

According to some examples the positioning mode capability comprises user equipment based or user equipment assisted.

According to some examples the positioning method capability comprises one or more of: NR-ECID; UL-ToA; UL-AoA; DL-ToA; DL-AoD.

According to some examples the apparatus comprises means for performing the triggering a location procedure in a manner that uses information stored in the apparatus and that is blind to positioning capability information of the user equipment.

According to some examples the information that is stored in the apparatus comprises one or more of: one or more positioning methods stored by the apparatus; information of whether the deployment is indoors or outdoors.

According to some examples the apparatus comprises means for selecting the location procedure prior to triggering the location procedure.

According to some examples the means for selecting is configured to select from a plurality of location procedures stored in a table.

According to some examples the means for selecting is configured to select one of the following location procedures: RAN Triggered MO-LR UE based; RAN Triggered MTLR UE assisted; RAN Triggered MT-LR NR-RAN assisted.

According to some examples the one or more functions to be performed at the apparatus comprise one or more artificial intelligence or machine learning functions.

According to some examples, the one or more functions to be performed at the apparatus comprise one or more artificial intelligence or machine learning functions related to one or more of: energy saving; mobility optimization; load balancing.

According to some examples the one or more functions to be performed at the apparatus comprise one or more artificial intelligence or machine learning training functions.

According to some examples the apparatus comprises means for receiving a Routing ID of a location management function.

According to some examples the means for receiving a Routing ID is configured to receive the Routing ID from an Access and Mobility Management Function during a set-up procedure of the user equipment.

According to some examples the apparatus comprises means for contacting the location management function as part of the location procedure.

According to some examples, the apparatus comprises means for, as part of the triggering a location procedure, sending a positioning request for multiple user equipment in a single message.

According to some examples the apparatus comprises an NG_RAN apparatus.

According to some examples the means comprises at least one processor; and at least one memory storing instructions that, when executed by the at least one processor, cause the performance of the apparatus.

According to a second aspect there is provided a radio access network apparatus comprising: at least one processor; and at least one memory storing instructions that, when executed by the at least one processor, cause the apparatus at least to perform: determining, by the apparatus, that position information of a user equipment is needed for one or more functions to be performed at the apparatus; and triggering a location procedure for obtaining positioning information of the user equipment, in response to the determining that position information of the user equipment is needed.

According to a third aspect there is provided a radio access network apparatus comprising: circuitry for determining, by the apparatus, that position information of a user equipment is needed for one or more functions to be performed at the apparatus; and circuitry for triggering a location procedure for obtaining positioning information of the user equipment, in response to the determining that position information of the user equipment is needed.

According to a fourth aspect there is provided a method performed by a radio access network apparatus, the method comprising: determining, by the apparatus, that position information of a user equipment is needed for one or more functions to be performed at the apparatus; and triggering a location procedure for obtaining positioning information of the user equipment, in response to the determining that position information of the user equipment is needed.

According to some examples the method comprises causing the apparatus to act as a Location Control Session Client.

According to some examples the method comprises sending a request to a core network entity for the positioning information of the user equipment.

According to some examples the request to the core network comprises a Location Control Session Quality of Service threshold value.

According to some examples the method comprises checking positioning capability information of the user equipment, in response to the determining that position information of the user equipment is needed, and performing the triggering a location procedure in a manner dependent on the capability information.

According to some examples the method comprises sending a request for the positioning capability information of the user equipment.

According to some examples the method comprises receiving the positioning capability information of the user equipment without having sent a request.

According to some examples the positioning capability information of the user equipment comprises information of a positioning mode capability or a positioning method capability.

According to some examples the positioning mode capability comprises user equipment based or user equipment assisted.

According to some examples the positioning method capability comprises one or more of: NR-ECID; UL-ToA; UL-AoA; DL-ToA; DL-AoD.

According to some examples the method comprises performing the triggering a location procedure in a manner that uses information stored in the apparatus and that is blind to positioning capability information of the user equipment.

According to some examples the information that is stored in the apparatus comprises one or more of: one or more positioning methods stored by the apparatus; information of whether the deployment is indoors or outdoors.

According to some examples the method comprises selecting the location procedure prior to triggering the location procedure.

According to some examples the method comprises selecting from a plurality of location procedures stored in a table.

According to some examples the selecting comprises selecting one of the following location procedures: RAN Triggered MO-LR UE based; RAN Triggered MTLR UE assisted; RAN Triggered MT-LR NR-RAN assisted.

According to some examples the one or more functions to be performed at the apparatus comprise one or more artificial intelligence or machine learning functions.

According to some examples, the one or more functions to be performed at the apparatus comprise one or more artificial intelligence or machine learning functions related to one or more of: energy saving; mobility optimization; load balancing.

According to some examples the one or more functions to be performed at the apparatus comprise one or more artificial intelligence or machine learning training functions.

According to some examples the method comprises receiving a Routing ID of a location management function.

According to some examples the receiving a Routing ID comprises receiving the Routing ID from an Access and Mobility Management Function during a set-up procedure of the user equipment.

According to some examples the method comprises contacting the location management function as part of the location procedure.

According to some examples the method comprises, as part of the triggering a location procedure, sending a positioning request for multiple user equipment in a single message.

According to some examples the apparatus comprises an NG_RAN apparatus. According to a fifth aspect there is provided a computer program comprising instructions which, when executed by a radio access network apparatus, cause the apparatus to perform at least the following: determining, by the apparatus, that position information of a user equipment is needed for one or more functions to be performed at the apparatus; and triggering a location procedure for obtaining positioning information of the user equipment, in response to the determining that position information of the user equipment is needed.

According to a sixth aspect there is provided a computer program comprising instructions stored thereon for performing at least the following: determining, by a radio access network apparatus, that position information of a user equipment is needed for one or more functions to be performed at the apparatus; and triggering a location procedure for obtaining positioning information of the user equipment, in response to the determining that position information of the user equipment is needed.

According to a seventh aspect there is provided a non-transitory computer readable medium comprising program instructions that, when executed by a radio access network apparatus, cause the apparatus to perform at least the following: determining, by the apparatus, that position information of a user equipment is needed for one or more functions to be performed at the apparatus; and triggering a location procedure for obtaining positioning information of the user equipment, in response to the determining that position information of the user equipment is needed.

According to an eighth aspect there is provided a non-transitory computer readable medium comprising program instructions stored thereon for performing at least the following: determining, by a radio access network apparatus, that position information of a user equipment is needed for one or more functions to be performed at the apparatus; and triggering a location procedure for obtaining positioning information of the user equipment, in response to the determining that position information of the user equipment is needed.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

In the following, certain examples are explained with reference to mobile communication devices capable of communication via a wireless cellular system and mobile communication systems serving such mobile communication devices. Before explaining in detail the examples, certain general principles of a wireless communication system are briefly explained with reference to FIG. 1 to assist in understanding the technology underlying the described examples.

Figure 1:
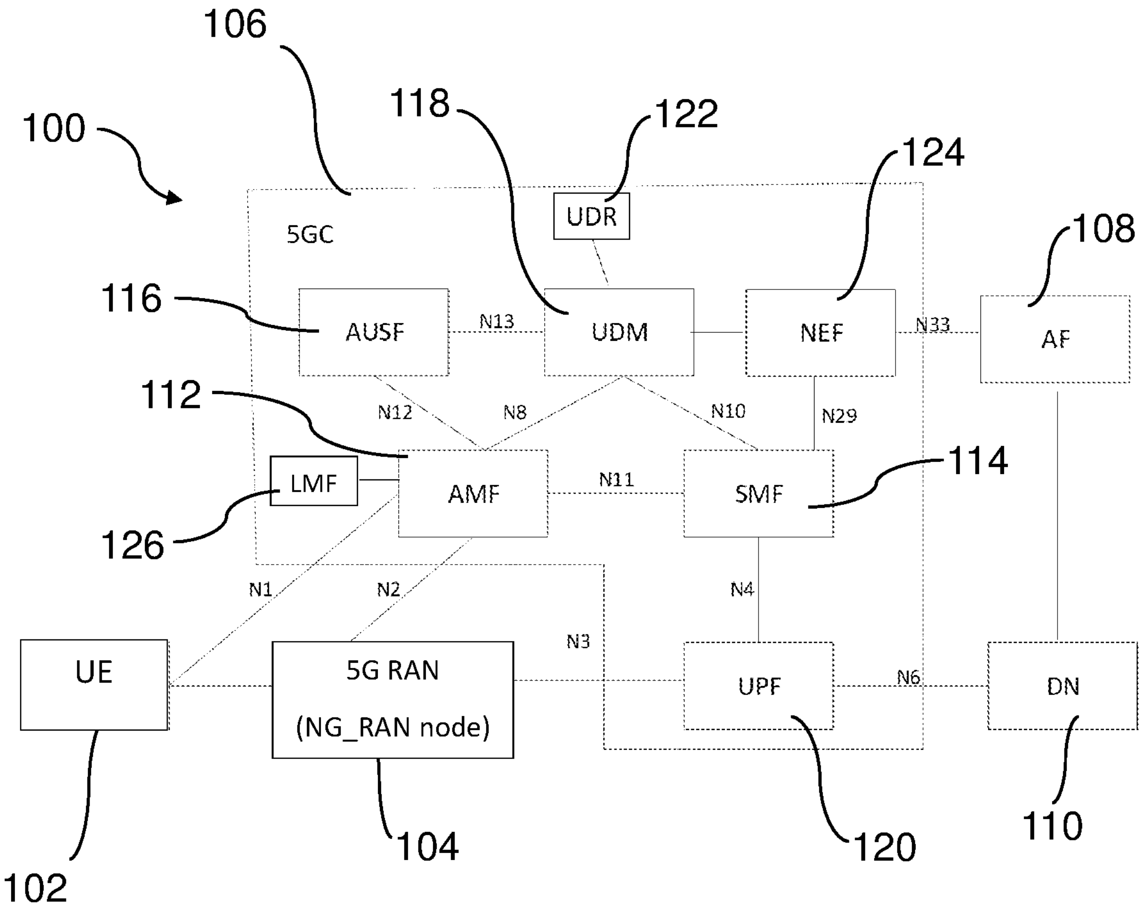
FIG. 1 shows a representation of a network system according to an example.

FIG. 1 shows a schematic representation of a 5G system (5GS) 100. The 5GS may comprise a user equipment (UE) 102 (which may also be referred to as a communication device or a terminal), a 5G radio access network (5G RAN) 104, a 5G core network (5GCN) 106, one or more application functions (AF) 108 and one or more data networks (DN) 110. 5G RAN 104 may also be referred to as an NG-RAN node. An NG_RAN node (e.g. NG_RAN node 104) may comprise one or more gNodeB (gNB) distributed unit functions connected to one or more gNodeB (gNB) centralized unit functions. The 5G RAN 104 may comprise one or more access nodes.

The 5G CN 106 may comprise one or more access management functions (AMF) 112, one or more session management functions (SMF) 114, an authentication server function (AUSF) 116, a unified data management (UDM) 118, one or more user plane functions (UPF) 120, a unified data repository (UDR) 122 and/or a network exposure function (NEF) 124, a location management function (LMF) 126.

Currently, UE location awareness in NG-RAN is as follows:

- Location can be assumed to be available at the level of cell ID e.g. NR Cell Global Identifier (NR CGI), Tracking Area Identity (TAI), primary and secondary cell identifiers (PSCell ID) (in dual connectivity (DC) cases).
- UE location can be also queried by the RAN over RRC using RRC UE Information procedure. In this procedure, thehe UE location is based on A-GNSS (global navigation satellite system) measurements. In some cases, it is also possible that UE reports its Bluetooth®, sensor or WLAN location information. Bluetooth® location information includes Bluetooth® information such as Bluetooth® measurement results in order of decreasing RSSI for Bluetooth® beacons. Sensor location information, when available, may provide barometric pressure measurements and motion sensor measurements. WLAN location information includes WLAN measurement results in order of decreasing RSSI for WLAN APs.
- Measurements based on the NR positioning methods are not available to the NG-RAN since all of those methods are managed by the LMF. Even though UE reports this information to the RAN the information is transferred transparently to LMF, the entity managing NR positioning methods.
- The present disclosure notes that currently there is no procedure defined for the NG-RAN to query the UE location either from the UE or from the LMF.

According to current positioning architecture, the LMF is the entity which entirely hosts the network positioning control. It is therefore the responsibility of the LMF to provide the correct configuration to the RAN for positioning measurements. It is also the responsibility of the LMF to decide whether a positioning measurement needs to be calculated.

With the introduction of artificial intelligence and machine learning (AI/ML) in NG-RAN architecture, it is possible that a node, such as a base station (gNB), needs positioning information for its own AI/ML operations (i.e. operations of the gNB). Where reference is made to an NG_RAN or NG_RAN node, this may also be considered to be reference to a gNB and vice versa. For example, when an AI/ML Model is trained in the gNB, location information (such as detailed coordinates, serving cell ID, moving velocity) may be of high importance in the AI/ML training process. Similarly, during AI/ML inference a prediction may depend on the detailed location that a UE may find itself into. For example, a gNB can calculate a predicted UE trajectory using location information, such as cell or detailed location information. The gNB may use also detailed location information to calculate a predicted velocity that a certain UE is expected to have at a certain point in time. In a handover scenario, a gNB may use detailed location information to determine when a handover shall be triggered to a target node and even select the best predicted target node based on UE location information.

Even though RAN may have sufficient information related to serving cell ID of a UE, access to detailed coordinates in the NG-RAN is more complex. Minimization of Drive Tests (MDT) framework allows a gNB to request positioning information from certain UEs. However, provision of positioning measurements from UEs is subject to user consent, and therefore provisioning of such positioning measurements may not be available from certain UEs with specific characteristics (being in certain areas/using certain services/etc.). Besides user consent, A-GNSS has user preference dependency i.e., a UE may switch off its GPS, making the UE unable to provide detailed location information to the network. The above can create or introduce biases into an ML Model using location information for the training process, which may negatively impact the ML model quality. Therefore, the present disclosure has identified that UE Position data may have increased relevance for training of an AI/ML Model in NG-RAN. The present disclosure also notes that a consistent, large amount of data may be required for training, and current A-GNSS based MDT may not guarantee that. Also, the present disclosure identifies that future use cases such as mMIMO (massive multiple-input multiple-output) in RAN may be helped with accurate UE location.

The present disclosure also identifies that some other issue with A-GNSS-based location includes that it may not work reliably in indoor environments.

Therefore, the current positioning framework may not allow the RAN to access positioning information based on NR based methods, and therefore all the improvements/enhancements being specified in Rel-16+ are not accessible to the RAN.

Figure 2:
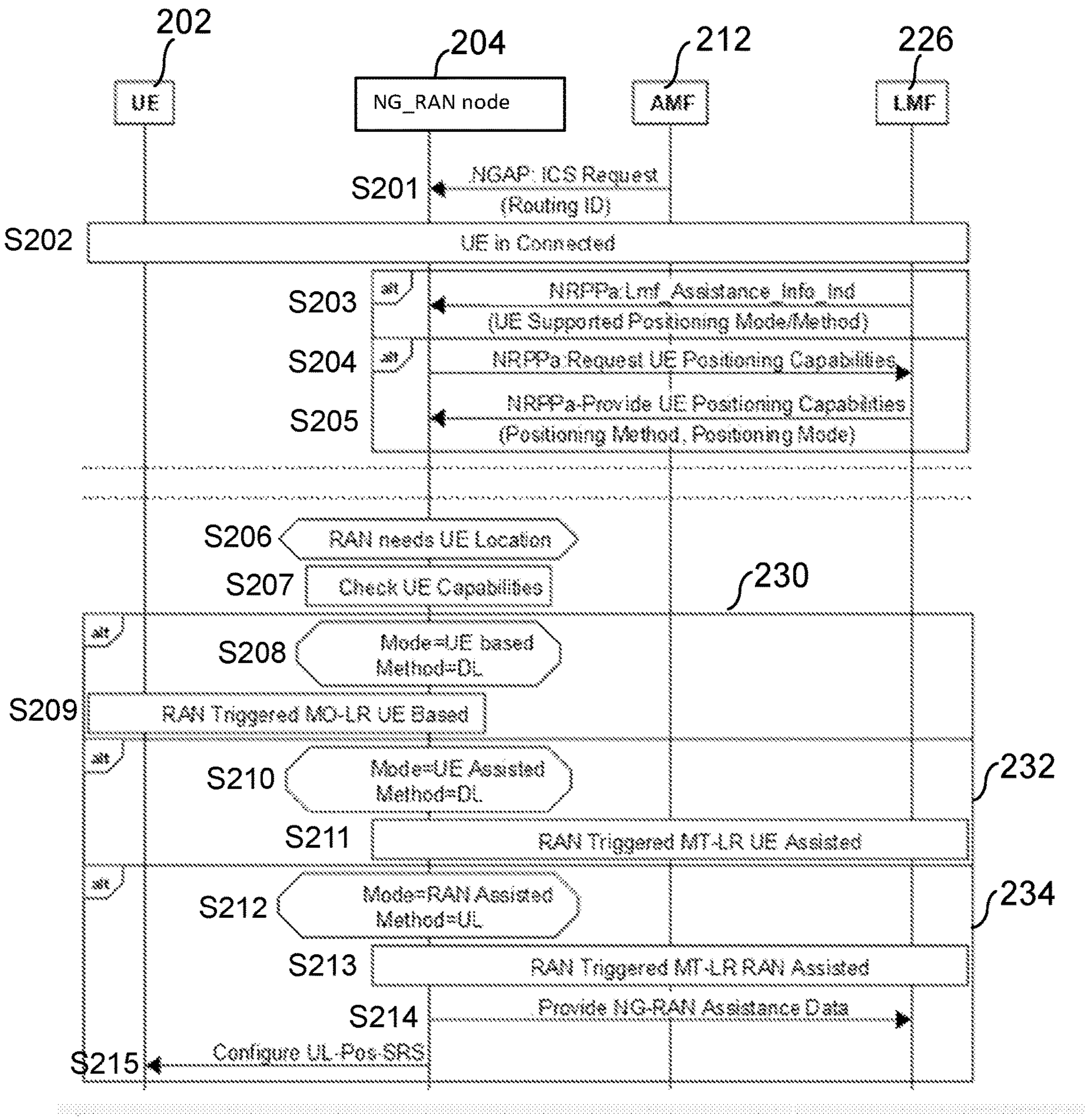
FIG. 2 is a signalling diagram according to an example.

As will be discussed in more detail below, the present disclosure proposes to enhance the UE Positioning architecture to enable the RAN to collect UE location data when required by RAN. According to some examples the LMF still manages the overall positioning procedures. FIG. 2 is a signaling diagram according to an example, which schematically shows signaling between a UE 202, an NG-RAN node 204, an AMF 212 and an LMF 226. The signaling diagram shows an overall procedure to enable the NG-RAN node 204 to access UE location information (i.e. location information of UE 202 in this example), so that the NG-RAN node 204 can use this location information for internal algorithms in the NG-RAN node.

There are two main schemes or methods which will be described with respect to FIG. 2, which are discussed in-turn below.

Scheme 1

According to the first scheme, the NG-RAN node 204 has knowledge or intelligence of UE positioning capabilities (i.e. positioning capabilities of UE 202 in this example). In some examples, positioning capabilities may refer to positioning methods that are supported by the UE e.g. UL-AoA; DL-AoD; supported periodicity values, supported positioning modes (like UE based, UE assisted) etc.) The NG-RAN node can use the information of UE positioning capabilities for triggering appropriate location control session (LCS) procedure.

At S201, AMF 212 transmits or shares LMF Routing ID to the NG-RAN node 204. In some examples, this is as part of ICS Setup procedure for a given UE (e.g. UE 202). According to some examples, this assumes that a default LMF location (e.g. location of LMF 226) is configured in the AMF 212 for RAN positioning. According to some examples, if an LMF reselection then subsequently happens for the UE 202 (for example as part of MOLR/MTLR), then a new Routing ID is conveyed using a modification procedure. For example the modification procedure may comprise an NGAP: UE Context Modification procedure. According to some examples, the routing ID is used in the NRPPa signaling (between the RAN and LMF) to identify the LMF. In examples, the AMF sends this routing ID value to the RAN in NRPPa messages. The RAN then returns the routing ID in the response message, and the AMF then uses the same to forward that message to the correct LMF.

As shown schematically at S202, the UE 202 is in Connected mode.

At S203, the LMF shares information of capabilities of UE 202. In this example, at S203 this information is shared with NG-RAN node 204. For example, the capability information may comprise one or more of: Positioning Mode (e.g. UE based or UE assisted); Positioning Method (e.g. NR-ECID, UL-TOA, UL-AOA, DL-TOA, DL-AoD) to give some examples.

S204 and S205 are one alternative to S203. At S204, the NG-RAN node 204 sends a query to LMF 226 for information of UE Positioning Capabilities. For example, the NG-RAN node 204 may use the Routing ID received at S201 for this purpose. At S205, the NG-RAN node 204 receives the information of UE positioning capabilities from the LMF 226.

At S206, NG-RAN node 204 determines that it needs location information of UE 202, for use by the NG-RAN node 204 (for example for use in its internal algorithms). In some examples, these algorithms may be legacy algorithms or algorithms based on AI/ML intelligence. For example, these AI/ML algorithms may have been trained, as described above.

Then, at S207 the NG-RAN node checks the UE capability information that it has already received (e.g. at S205), and uses the received values.

A first alternative is shown at S208 and S209, and the box generally shown at 230. At S208, when the NG-RAN node 204 determines that the UE 202 supports UE-based positioning and downlink (DL) methods, then the NG-RAN node 204 initiates the RAN triggered MOLR UE based procedure as given in S209, accordingly. This is described in more detail below with respect to FIG. 3.

A second alternative is shown at S210 and S211, and the box generally shown at 232. At S210, when the NG-RAN node 204 determines that the UE 202 supports UE assisted positioning and DL methods, then the NG-RAN node 204 initiates RAN Triggered MTLR UE Assisted procedure. This is described in more detail below with respect to FIG. 4. A third alternative is shown at S212 to S215, and the box generally shown at 234.

At S212, NG-RAN node 204 determines that UE 202 supports RAN-based positioning and uplink methods.

At S213, the NG-RAN node 204 uses RAN Triggered MTLR RAN assisted procedure. This is described in more detail below with respect to FIG. 5.

The procedure then continues to S214 and S215. At S214, the NG-RAN node 204 provides assistance data to the LMF 226. For example, the NG-RAN node 204 may provide the information that the LMF 226 requires to carry out the UL method. Then, as shown at S215 the NG-RAN node 204 configures the UE 202 with Sounding Reference Signal (SRS) resources.

A choice of which procedure to use (e.g. which of the procedures shown in boxes 230, 232, 234 in FIG. 2) can be based on the information shown in Table 1 below.

TABLE 1

| Positioning Method | UE Based | Proposed Procedure | LMF Based UE Assisted | Proposed Procedure | LMF Based NG RAN node Assisted | Proposed Procedure |
|---|---|---|---|---|---|---|
| UL-NR-ECID | NA | NA | NA | NA | Supported | NG RAN node requests AMF/LMF for location along with assistance data |

TABLE 1-continued

| Positioning Method | UE Based | Proposed Procedure | LMF Based UE Assisted | Proposed Procedure | LMF Based NG RAN node Assisted | Proposed Procedure |
|---|---|---|---|---|---|---|
| DL-NR-ECID | NA | NA | Supported | NG RAN node requests AMF/LMF for location | NA | NA |
| UL-AoA | NA | NA | NA | NA | Supported | NG RAN node requests AMF/LMF for location along with assistance data |
| UL-ToA | NA | NA | NA | NA | Supported | NG RAN node requests AMF/LMF for location along with assistance data |
| DL-AoD | Supported | NG RAN node requests UE for location | Supported | NG RAN node requests AMF/LMF for location | NA | NA |
| DL-ToA | Supported | NG RAN node requests UE for location | Supported | NG RAN node requests AMF/LMF for location | NA | NA |
| MC-RTT | NA | NA | Supported | | Supported | NG RAN node requests AMF/LMF for location along with assistance data |

Table 1 sets out, for each positioning method (first column), whether UE based, LMF based UE assisted, or LMF based NG RAN node assisted procedure is supported, and an accompanying proposed procedure.

For example, for UL-NR-ECID (first row), LMF based NG RAN node assisted procedure is supported. In more detail, the proposed procedure is that the NG RAN node requests AMF/LMF for location along with assistance data.

In another example, for DL-AoD positioning method (fifth row), both (i) UE based and (ii) LMF based UE assisted procedure are supported. For UE based procedure, the NG RAN node requests location information from UE. For LMF based UE assisted procedure, the NG RAN node requests the AMF/LMF for UE location information.

Scheme 2

In Scheme 2, the NG-RAN node 204 triggers UE positioning procedure in a blind fashion. Under Scheme 2, some steps shown in the signalling diagram of FIG. 2 are omitted. For example, in Scheme 2, S203 to S205 and S207 are omitted. Therefore, the NG-RAN node 204 has no information of UE capabilities (positioning mode or method supported). Then, when NG-RAN node 204 requires position information of UE 202, the NG-RAN node 204 triggers or initiates one or more of steps: S209; S211; S213. In some examples, the NG-RAN node 204 does this autonomously, based on intelligence or considerations in the NG-RAN node. For example, the intelligence and/or considerations that are taken into account may include one or more of:

Positioning methods supported by the NG-RAN node.

Whether the deployment is for an indoors or outdoors network. In some examples, when it is determined that the deployment is for an indoors network the NG-RAN may choose to trigger only S213—RAN Triggered MTLR RAN Assisted procedure. This is because, in some examples, UL methods (where RAN performs the measurements) are more suited to indoors deployments.

According to some examples, if a given method/mode is not supported, either the UE or the LMF may choose to reject the positioning request (for both Scheme 1 and Scheme 2). It can therefore be observed that:

Scheme-1 adds intelligence in the NG-RAN about UE Positioning capabilities, thereby enabling an NG-RAN node to choose the correct procedure to get the UE position.

Scheme-2 assists the positioning procedure but may not add any new knowledge of the UE Positioning capabilities in the NG-RAN itself. Therefore, there is potentially a possibility of the RAN positioning request being rejected. Accordingly, in some examples Scheme 1 may be considered the favorable option where available.

Figure 3:
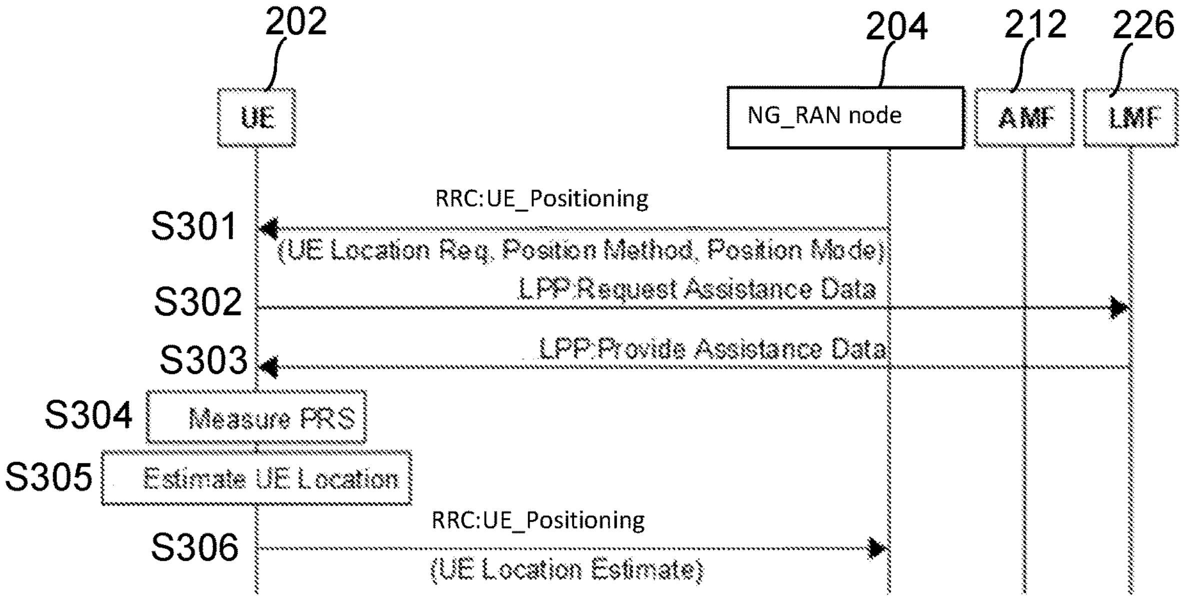
FIG. 3 is a signalling diagram according to an example.

FIG. 3 shows the RAN Triggered MOLR UE based procedure in more detail. For example, the overall method of FIG. 3 may correspond to S209 as shown in FIG. 2. Again, FIG. 3 shows communication between UE 202, NG-RAN node 204, AMF 212 and LMF 226.

At S301, the NG-RAN node 204 triggers UE based positioning. For example, NG-RAN node 204 may initiate a new RRC procedure RRC: UE_Positioning. For example, this message may include a UE location request, and specify a positioning method and/or mode to be used.

At S302 the UE 302 requests assistance data from LMF 226. At S303, the LMF 226 provides assistance data to UE 202.

Then, at S304 the UE 202 performs one or more measurements for positioning. For example, the UE 202 may measure positioning reference signals (PRS). At S305, the UE 202 estimates its location.

Then, at S306 the UE sends its location information to the NG-RAN node 204. For example, the UE may send this information in RRC:UE_Positioning Procedure.

In some examples, the NG-RAN node configures the UE to provide periodic UE location estimates.

In some examples, if the UE doesn't support the mode/method, the UE may reject the request (e.g. Scheme-2).

Figure 4:
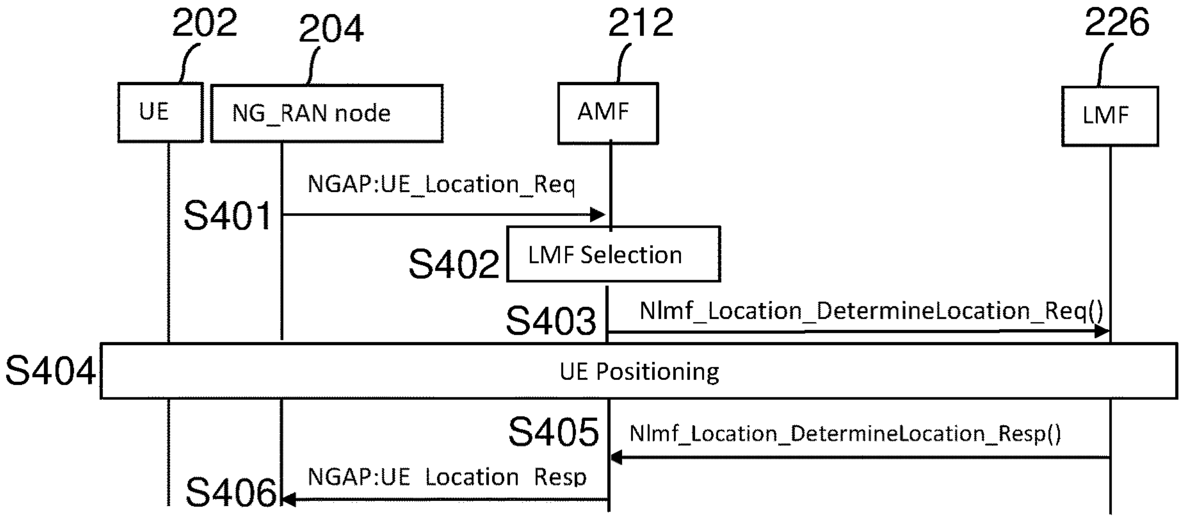
FIG. 4 is a signalling diagram according to an example.

FIG. 4 shows RAN Triggered MTLR UE Assisted procedure in more detail. For example, the overall method of FIG. 4 may correspond to S211 as shown in FIG. 2.

Again, FIG. 4 shows communication between UE 202, NG-RAN node 204, AMF 212 and LMF 226.

As shown at S401, the NG-RAN node 204 triggers UE assisted positioning. For example, the NG-RAN node 204 may send a request to AMF 212. For example, the request may be an NGAP:UE_Location_Req. In some examples, the request may comprise an LCS QoS value along with the request. In some examples the LCS QoS value comprises a QoS requirement of the LCS client which requests location of a given UE. For example, where UE location is requested by NG_RAN node, the NG_RAN node acts as the LCS client and provides an LCS QoS. The QoS typically consists of parameters like a required accuracy of location, latency required etc.

Then, at S402 the AMF 212 optionally performs LMF selection or reselection (the NG-RAN node may have already performed a provisional LMF selection, for example at S201 of FIG. 2).

This may trigger the MTLR procedure, and cause NG-RAN node 204 to send location determination request to LMF 226, as shown at S403.

At S404, the UE positioning procedure takes place.

At S405, LMF 226 sends UE location information of UE 202 to AMF 212. For example this may comprise an Nlmf_Location_DetermineLocation_Resp( ) message.

At S406, the AMF 212 sends the location information of UE 202 to the NG-RAN node 204. For example, this may comprise an NGAP:UE_Location_Resp message.

In some examples, the NG-RAN node configures the AMF to provide periodic UE location estimates. In some examples, if the UE doesn't support the mode/method, the LMF may reject the request (e.g. Scheme-2).

Figure 5:
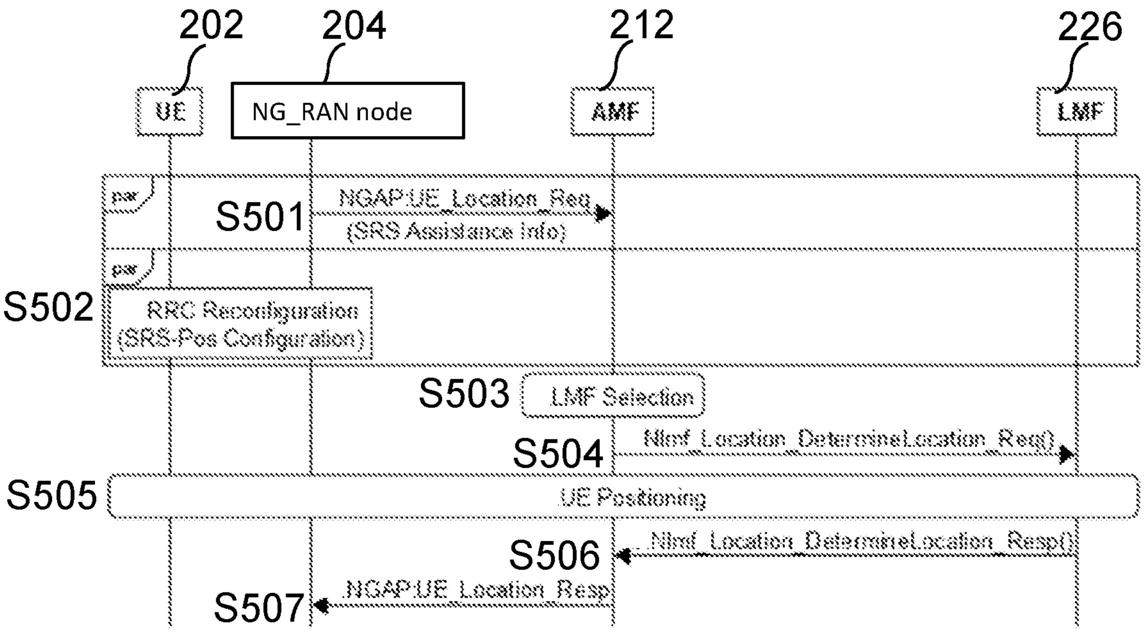
FIG. 5 is a signalling diagram according to an example.

FIG. 5 shows the RAN Triggered MT-LR NR-RAN Assisted based procedure in more detail. For example, the overall method of FIG. 5 may correspond to S213 as shown in FIG. 2. Again, FIG. 5 shows communication between UE 202, NG-RAN node 204, AMF 212 and LMF 226.

As shown at S501, the NG-RAN node 204 triggers the RAN assisted positioning. For example, the NG-RAN node 204 may send a request message to AMF 212. For example, the request message may be an NGAP: UE_Location_Req message. The message may also request SRS (Sounding Reference Signal) Assistance Information. In some examples, the NG-RAN node 204 also provides an LCS QoS value along with the request.

Subsequently, or in parallel, the NG-RAN node 204 may configure the UE 202 to send the SRS-Positioning reference signals, to be used for the UL method. This is shown at S502.

Optionally, at S503, the AMF 212 performs LMF selection or reselection (the NG-RAN node may have already performed a provisional LMF selection, for example at S201 of FIG. 2).

The AMF then triggers the MTLR procedure. For example, the AMF 212 may send a location request to LMF 226, for location information of UE 202. In some examples, this message is in the form Nlmf_Location_DetermineLocation_Req( ).

At S505, the UE positioning procedure takes place.

At S506, the LMF 226 sends location information of UE 202 to AMF 212. For example this message may be in the form Nlmf_Location_DetermineLocation_Resp( ).

At S507, the AMF 212 sends location information of UE 202 to NG-RAN node 204. In some examples, the NG-RAN configures the AMF to provide periodic UE location estimates.

In some examples, if the UE doesn't support the mode/method, the LMF may reject the request (e.g. Scheme-2).

From the foregoing it will be appreciated that the present disclosure provides:

- An LMF assisted method (Scheme-1), where a NG-RAN node has intelligence of UE Positioning Capabilities and uses the same for triggering the appropriate LCS procedure. A blind method (Scheme-2) where a NG-RAN node is not aware of the UE positioning capabilities, and may request any/all of the 3 procedures proposed in FIGS. 3 to 5 respectively.
- A new NRPPa procedure through which a NG-RAN node can request and obtain UE location capabilities.
- New logic in the NG-RAN node to use the returned UE location capabilities to determine if the location request is to be sent to the UE or to the LMF
- A new NGAP or NRPPa procedure that a NG-RAN node can use to request the LMF for the UE's location.
- Introduce a new procedure RRC:UE Positioning to allow the NG-RAN to request UE location with the UE.
- Signaling enhancement to make RRC/NRPPa signaling parallel in the NG-RAN assisted MTLR procedure to reduce the time taken for the UE position estimate.
- NGAP/NRPPa signaling enhancement that allows NG_RAN node to request position information of multiple user equipment simultaneously, in a single message.

Figure 6:
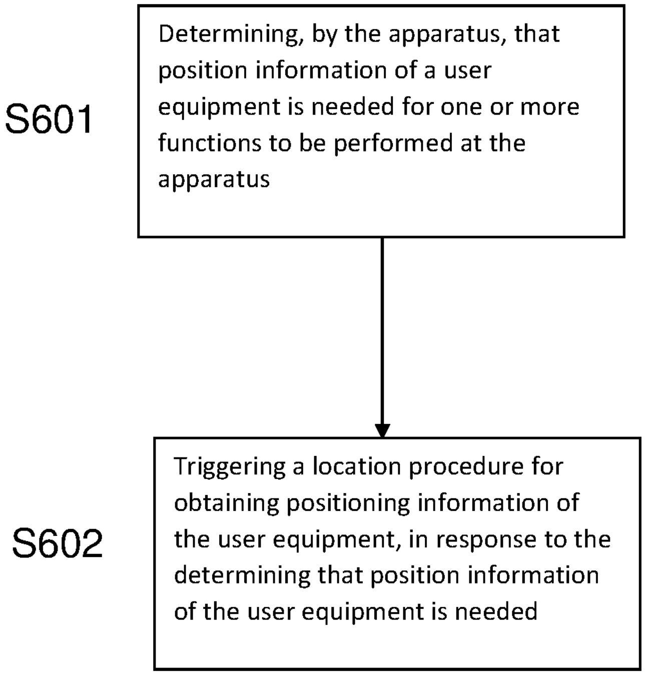
FIG. 6 is a flow chart according to an example.

FIG. 6 is a flow chart of a method. FIG. 6 is viewed from the perspective of an apparatus. For example, the apparatus may comprise a radio access network apparatus. For example, the apparatus may comprise an NG_RAN node.

As shown at S601, the method comprises determining, by the apparatus, that position information of a user equipment is needed for one or more functions to be performed at the apparatus.

As shown at S602, the method comprises triggering a location procedure for obtaining positioning information of the user equipment, in response to the determining that position information of the user equipment is needed.

Figure 7:
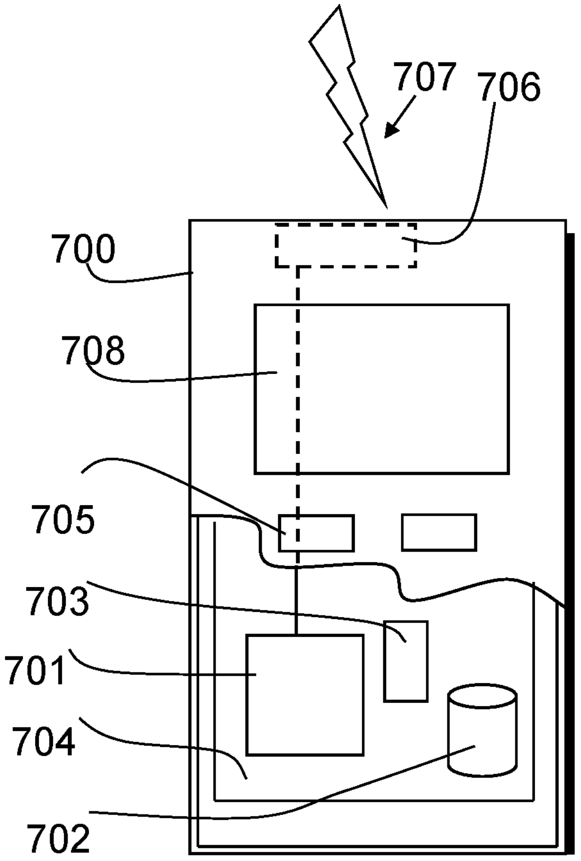
FIG. 7 shows a representation of a wireless apparatus according to an example.

A possible wireless communication device will now be described in more detail with reference to FIG. 7 showing a schematic, partially sectioned view of a communication device 700. A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 700 may receive signals over an air or radio interface 707 via appropriate apparatus for receiving and may transmit signals via appropriate apparatus for transmitting radio signals. In FIG. 7 transceiver apparatus is designated schematically by block 706. The transceiver apparatus 706 may be provided for example by means of a radio part and associated antenna arrangement. The antenna arrangement may be arranged internally or externally to the wireless device. A wireless device is typically provided with at least one data processing entity 701, at least one memory 702 and other possible components 703 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 705, voice commands, touch sensitive screen or pad, combinations thereof or the like. A display 708, a speaker and a microphone can be also provided. Furthermore, a wireless communication device may comprise appropriate connectors (either wired or wireless) to other devices and/or for connecting external accessories, for example hands-free equipment, thereto.

Figure 8:
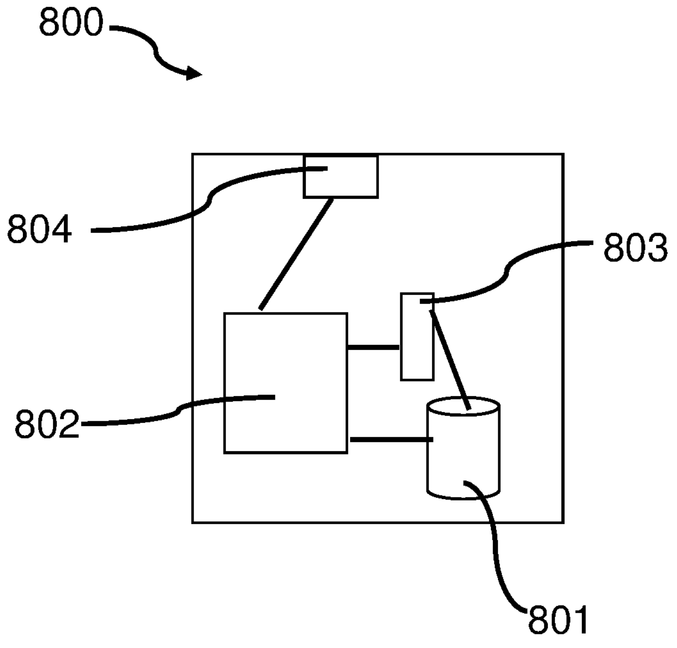
FIG. 8 shows a representation of a control apparatus according to an example.

FIG. 8 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 800 can be arranged to provide control on communications in the service area of the system. The control apparatus 800 comprises at least one memory 801, at least one data processing unit 802, 803 and an input/output interface 804. Via the interface the control apparatus can be coupled to a receiver and a transmitter of the base station. The receiver and/or the transmitter may be implemented as a radio front end or a remote radio head. For example the control apparatus 800 or processor 801 can be configured to execute an appropriate software code to provide the control functions.

Figure 9:
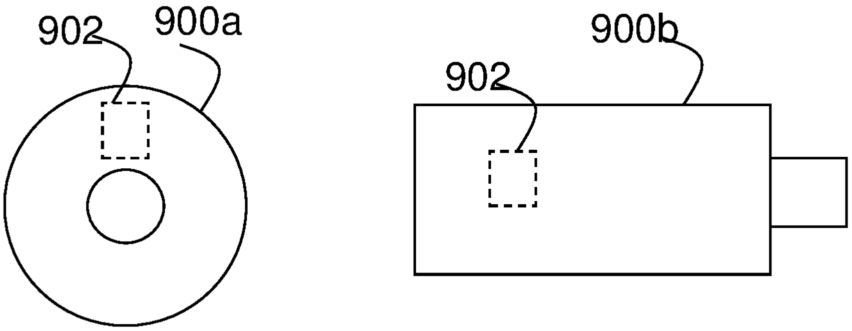
FIG. 9 shows a schematic representation of non-volatile memory media.

FIG. 9 shows a schematic representation of non-volatile memory media 900*a* (e.g. computer disc (CD) or digital versatile disc (DVD)) and 900*b* (e.g. universal serial bus (USB) memory stick) storing instructions and/or parameters 902 which when executed by a processor allow the processor to perform one or more of the steps of the methods of FIG. 6. In general, the various embodiments may be implemented in hardware or special purpose circuits, software, logic or any combination thereof. Some aspects of the disclosure may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

hardware-only circuit implementations (such as implementations in only analog and/or digital circuitry) and combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory." as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

ABBREVIATIONS

MO-LR—Mobile Originated Location Request
MT-LR—Mobile Terminated Location Request
NI-LR—Network Induced Location Request
LPP—LTE Positioning Protocol
NRPPa—NR Positioning Protocol Annexe
LCS—Location Control Session
ICS—Initial Context Setup
NR-ECID—NR Enhanced Cell ID
UL-ToA—Uplink Time of Arrival
UL-AoA—Uplink Angle of Arrival
DL-ToA Downlink Time of Arrival
DL-AoD—Downlink Angle of Departure
MDT—Mobile Drive Testing

The invention claimed is:

1. An apparatus comprising:

at least one processor; and at least one memory storing instructions that, when executed by the at least one processor, cause the apparatus at least to perform:

receiving positioning capability information of a user equipment (UE) without having sent a request, the positioning capability information of the UE comprising information stored in a table, the table comprising the following information:

| Positioning Method | UE Based | Proposed Procedure | LMF Based UE Assisted |
|---|---|---|---|
| UL-NR-ECID | NA | NA | NA |
| DL-NR-ECID | NA | NA | Supported |
| UL-AoA | NA | NA | NA |
| UL-ToA | NA | NA | NA |
| DL-AoD | Supported | NG RAN node requests UE for location | Supported |
| DL-ToA | Supported | NG RAN node requests UE for location | Supported |
| MC-RTT | NA | NA | Supported |

| Positioning Method | Proposed Procedure | LMF Based NG RAN node Assisted | Proposed Procedure |
|---|---|---|---|
| UL-NR-ECID | NA | Supported | NG RAN node requests AMF/LMF for location along with assistance data |
| DL-NR-ECID | NG RAN node requests AMF/LMF for location | NA | NA |
| UL-AoA | NA | Supported | NG RAN node requests AMF/LMF for location along with assistance data |
| UL-ToA | NA | Supported | NG RAN node requests AMF/LMF for location along with assistance data |
| DL-AoD | NG RAN node requests AMF/LMF for location | NA | NA |
| DL-ToA | NG RAN node requests AMF/LMF for location | NA | NA |

-continued

| | | |
|---|---|---|
| MC-RTT | Supported | NG RAN node requests AMF/LMF for location along with assistance data |

wherein LMF is location management function, AMF is access and mobility management function, UL-NR-ECID is uplink NR enhanced cell ID, DL-NR-ECID is downlink enhanced cell ID, UL-AoA is uplink angle of arrival, UL-ToA is uplink time of arrival, DL-AoD is downlink angle of departure, DL-ToA is downlink time of arrival, and MC-RTT is multi-cell round-trip-time;

receiving, from the AMF, during a set-up procedure of the UE, a routing ID of the LMF;

receiving a new routing ID based on an LMF reselection for the UE;

determining, by the apparatus, that position information of the UE is needed for a machine learning function configured to perform energy saving, mobility optimization, and load balancing, to be performed at the apparatus;

checking the positioning capability information of the UE, in response to the determining that position information of the UE is needed;

selecting a location procedure from a plurality of location procedures stored in the table;

triggering the location procedure for obtaining positioning information of the UE, in response to the determining that position information of the UE is needed, wherein the triggering the location procedure is performed in a manner dependent on the positioning capability information;

acting as a Location Control Session Client; and sending a request to a core network entity for the positioning information of the user equipment, wherein the request to the core network comprises a Location Control Session Quality of Service threshold values for accuracy of location and for latency.

* * * * *